United States Patent
Abe

(10) Patent No.: US 11,222,481 B2
(45) Date of Patent: Jan. 11, 2022

(54) VISUALIZATION APPARATUS AND PROGRAM

(71) Applicant: Mitutoyo Corporation, Kanagawa (JP)

(72) Inventor: Shinsaku Abe, Hokkaido (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/838,624

(22) Filed: Apr. 2, 2020

(65) Prior Publication Data
US 2020/0342685 A1 Oct. 29, 2020

(30) Foreign Application Priority Data

Apr. 26, 2019 (JP) .............................. JP2019-086439
Mar. 9, 2020 (JP) .............................. JP2020-040292

(51) Int. Cl.
*G06F 3/0481* (2013.01)
*G06T 19/00* (2011.01)
*G06T 19/20* (2011.01)

(52) U.S. Cl.
CPC ........ *G06T 19/20* (2013.01); *G06T 2219/008* (2013.01)

(58) Field of Classification Search
CPC ...................................................... G06T 19/20
USPC ......................................................... 345/419
See application file for complete search history.

(56) References Cited

U.S. PATENT DOCUMENTS

| | | | | |
|---|---|---|---|---|
| 6,816,609 B1* | 11/2004 | Shimizu | .............. | G01B 11/024 348/86 |
| 9,892,564 B1* | 2/2018 | Cvetko | ................ | A61B 5/0071 |
| 2001/0040995 A1* | 11/2001 | Takada | ............... | G06K 9/00476 382/152 |
| 2007/0248283 A1* | 10/2007 | Mack | ...................... | G06T 5/002 382/284 |
| 2015/0262406 A1* | 9/2015 | Jeon | ....................... | G06T 19/006 345/420 |
| 2015/0331970 A1* | 11/2015 | Jovanovic | ........... | G06F 3/04815 703/1 |

(Continued)

FOREIGN PATENT DOCUMENTS

JP       2000-065561       3/2000

*Primary Examiner* — Javid A Amini
(74) *Attorney, Agent, or Firm* — Rankin, Hill & Clark LLP

(57) ABSTRACT

The visualization apparatus comprises: a display that enables visualization of a predetermined information by superimposing the predetermined information in a three-dimensional space; a three-dimensional sensor that detects coordinate information of objects existing in the three-dimensional space within a display range of the display; a fitting unit that sequentially acquires coordinate information of each object detected by the three-dimensional sensor, matches the coordinate information of the object with a three-dimensional model of a target object prepared in advance for each acquisition to specify the target object from among the objects, and sequentially fits the three-dimensional model to the specified target object; and a display control unit that make the display to display a back surface shape of the target object detected by the three-dimensional sensor with respect to the front in a gaze direction by superimposing and displaying a three-dimensional model corresponding to a shape viewed from the front in the gaze direction on the target object.

9 Claims, 7 Drawing Sheets

(56) References Cited

U.S. PATENT DOCUMENTS

2016/0125757 A1\* 5/2016 Maenishi ............... G09B 19/00
                                                    434/219
2016/0370971 A1\* 12/2016 Hackett ................... G06F 3/017
2019/0026956 A1\* 1/2019 Gausebeck ............ H04N 13/10

\* cited by examiner

VISUALIZATION APPARATUS AND PROGRAM

CROSS-REFERENCE TO RELATED APPLICATION

This non-provisional application claims priority under 35 U.S.C. § 119(a) from Japanese Patent Application No. 2019-086439, filed on Apr. 26, 2019, and Japanese Patent Application No. 2020-040292, filed on Mar. 9, 2020, the entire contents of which are incorporated herein by reference.

BACKGROUND

Technical Field

The present invention relates to a visualization apparatus for visualizing a back surface of a target object, and more particularly, to an apparatus effective for measurement by a three-dimensional measuring instrument.

Background Art

As one of the methods for measuring a three-dimensional shape of an article, there is a method using a three-dimensional measuring instrument (e.g., see JP-A-2000-65561). An exemplary three-dimensional measuring instrument is shown in FIG. 1A. The three-dimensional measuring instrument 10 is roughly divided into a main body 10a and a probe 10b having a stylus at tip thereof. The target object W of the measurement is placed on the main body 10a, and the probe 10b is attached to the main body 10a so as to be movable in the three-dimensional direction by a drive mechanism provided in the main body 10a.

The three-dimensional measuring instrument 10 measures the three-dimensional coordinate value of the contact position by bringing the tip of the probe into contact with the surface of the target object W. In addition to the contact type, there is also a non-contact type probe such as an optical type which measures the surface position by photographing the surface of the target object W from an arbitrary three-dimensional space position.

SUMMARY OF THE INVENTION

Problems to be Solved by the Invention

For example, as shown in FIG. 1B, when the three-dimensional measuring instrument 10 measures the depression D on the front face of the target object W as viewed from an operator, the depression D can be visually recognized from the viewpoint of the operator. In addition, the tip 10bt of the probe 10b in front of the target object W as viewed from the operator can also be visually recognized. Therefore, the tip 10bt can be brought into appropriate contact with the depression D. However, as shown in FIG. 1C, when the shape of the back surface of the target object W is measured without changing the arrangement of the target object W, the shape of the back surface cannot be visually recognized from the viewpoint of the operator. Further, since it is necessary to arrange the probe 10b behind the target object W, the tip 10bt cannot be visually recognized. Therefore, when measuring the back surface, the arrangement of the target object W is generally changed (for example, inverted) so that the back surface can be measured. However, when the arrangement of the target object is changed, the coordinate system must be reset so that the measurement coordinates on the object after the position change match the measurement coordinates at the same position before the position change. This causes problems such as a long measurement time.

It is an object of the present invention to provide a visualization apparatus and program that enable visualization of a back surface shape of a target object with respect to the front in a gaze direction of the operator as a shape viewed from the front in a gaze direction.

Means for Solving the Problems

The visualization apparatus of the present invention comprises: a display that displays predetermined information superimposed on a three-dimensional space to make the predetermined information visible; a three-dimensional sensor that detects coordinate information of objects existing in the three-dimensional space within a field of view through the display; a fitting unit that sequentially acquires coordinate information of each object detected by the three-dimensional sensor, matches the coordinate information of the object with a three-dimensional model of a target object prepared in advance for each acquisition to specify the target object from among the objects, and sequentially fits the three-dimensional model to the specified target object; and a display control unit that make the display to display a see-through region in the three-dimensional model so as to be superimposed on a predetermined gaze area of the target object. The see-through region is corresponding to the predetermined gaze area of the surface of the target object existing within the field of view through the display. The see-through region is seen through from the surface area of the three-dimensional model superimposed on the target object in a gaze direction from the three-dimensional sensor toward the approximate center of the predetermined gaze area. The display control unit may make the display to display the see-through region superimposed on a predetermined gaze area of the target object by transparentizing the region except the see-through region in the three-dimensional model superimposed on the target object. The predetermined gaze area may be, for example, a region of the surface of the target object to be visually recognized in a predetermined region in the display. The predetermined gaze area may be a predetermined region on the surface of the target object, centered on the intersection of a line from the predetermined position on the display toward the gaze direction and the surface of the target object. Here, the "predetermined position of the display" may be, for example, the center of the display. The "gaze direction" may be, for example, a direction perpendicular to the screen of the display, a direction of the line of sight, a direction at which the tip of the probe exists, or the like.

As a result, by viewing the surface of the target object through the display, the shape of the back surface of the target object can be seen through in a simulated manner. The display may be a transmissive display that allows the three-dimensional space to be viewed through the display screen, or a non-transmissive display that allows the three-dimensional space to be viewed by displaying an image of the three-dimensional space captured by a camera.

The visualization apparatus may further comprise: a measuring instrument information acquisition unit for acquiring information on the three-dimensional model and tip coordinates of a probe of a predetermined measuring instrument in which the measuring coordinate system is set to be the same as the detecting coordinate system of the three-dimensional sensor by a predetermined method; and a probe portion specifying unit for specifying, when the tip coordinates of the probe are included in a coordinate range behind the target object that sweeps through the predetermined gaze area of the target object in the gaze direction, the portion of the probe included in the coordinate range and the existence position of the portion based on the tip coordinates and the three-dimensional model of the probe. Then, the display control unit may superimpose a portion of the three-dimensional model of the probe on a predetermined gaze area of the target object so that a portion of the three-dimensional model of the probe corresponding to the portion of the probe is visually recognized at a position behind the see-through region corresponding to the existence position of the portion of the probe specified by the probe portion specifying unit. In this case, the predetermined gaze area may be, for example, a predetermined area of the surface of the target object centered on an intersection point between a line connecting the predetermined position of the display and the tip of the probe and the surface of the target object.

As a result, the measurement of the back surface of the target object by the measuring instrument can be performed from the front surface side while the position of the probe behind the target object and the back surface shape of the target object are seen through in a simulated manner.

A visualization apparatus according to another embodiment of the present invention comprises: a display that enables visualization of a predetermined information by superimposing the predetermined information in a three-dimensional space; a three-dimensional sensor that detects coordinate information of objects existing in the three-dimensional space within a display range of the display; a fitting unit that sequentially acquires coordinate information of each object detected by the three-dimensional sensor, matches the coordinate information of the object with a three-dimensional model of a target object prepared in advance for each acquisition to specify the target object from among the objects, and sequentially fits the three-dimensional model to the specified target object; and a display control unit that make the display to display a back surface shape of the target object detected by the three-dimensional sensor with respect to the front in a gaze direction by superimposing and displaying a three-dimensional model corresponding to a shape viewed from the front in the gaze direction on the target object.

Thus, by viewing the front of the target object through the display, the buck surface shape of the target object can be seen through in a simulated manner. The display may be a transmissive display that allows the three-dimensional space to be viewed through the display screen, or a non-transmissive display that allows the three-dimensional space to be viewed by displaying an image of the three-dimensional space captured by a camera.

In the present invention, the visualization apparatus may further comprises: a coordinate measuring instrument information acquisition unit for acquiring information of the tip coordinate of a probe in a predetermined measuring instrument in which the measuring coordinate system is set to be the same as the detection coordinate system of the three-dimensional sensor according to a predetermined method; and a probe portion specifying unit for specifying a portion of the probe overlapping the three-dimensional model of the back surface shape when the probe is present behind the three-dimensional model superimposed on the target object as the back surface shape of the target object viewed from the front in the gaze direction. The fitting unit may fit the three-dimensional model of the probe to the portion of the probe specified by the probe portion specifying unit. Further, the display control unit may make the three-dimensional model corresponding to the back surface shape of the target object viewed from the front in the gaze direction, and the three-dimensional model fitted to the portion of the probe present therebehind be visibly distinguished.

In the present invention, when the three-dimensional model corresponding to the shape seen from the front in the gaze direction is superimposed on the target object, the display control unit may not display the superimposed display of the region other than the specific range in the gaze direction.

Here, as a specific example of "visibly distinguished", the back surface shape may be displayed in the form of a grayscale display color or a wire frame format, while the portion of the probe may be displayed in a true color display color or in a texture map format so as to give a texture to the surface of the three-dimensional model. Thereby the back surface shape and the portion of the probe may be superimposed so that they can be clearly distinguished.

The functions of the respective units of the visualization apparatus of the present invention may be realized by being described in a program and executed by a computer.

DETAILED DESCRIPTION OF THE EMBODIMENTS

Figure 1A:
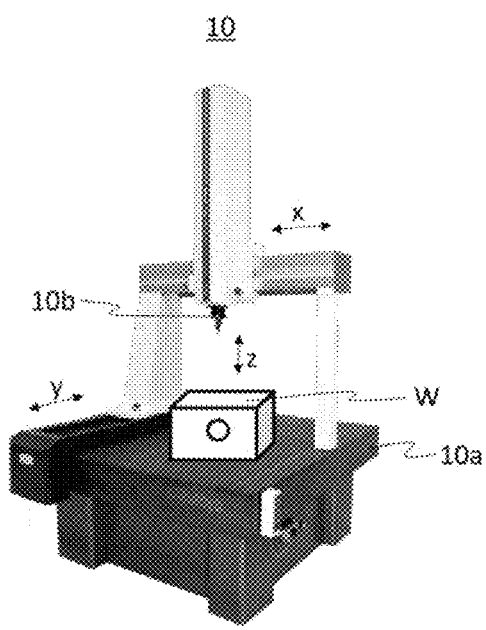
FIGS. 1A, 1B and 1C are diagrams illustrating problems in the conventional three-dimensional measurement.
Figure 1B:
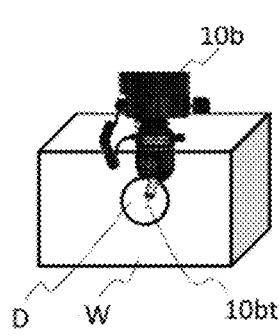
Figure 1C:
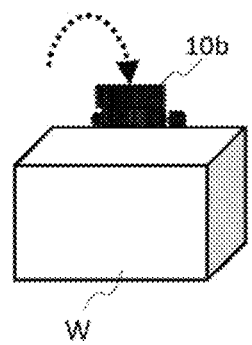

Embodiments of the present invention will be described below with reference to the drawings. In the following description, the same parts are denoted by the same reference numerals, and the description of the parts once described is omitted as appropriate.

First Embodiment

Figure 2:
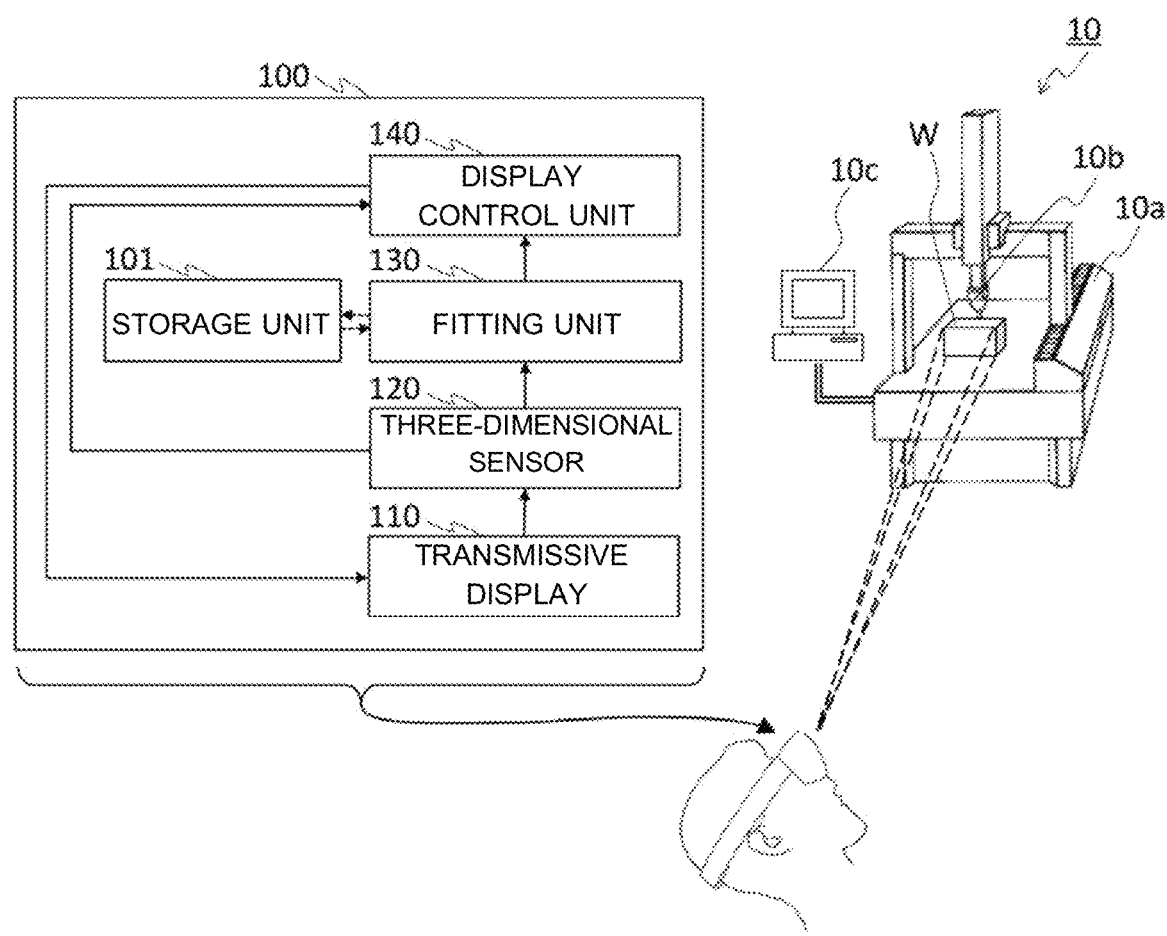
FIG. 2. is a functional block diagram of the visualization apparatus 100 of the present invention.

FIG. 2 is a functional block diagram of the visualization apparatus 100 of the present invention. The visualization apparatus 100 includes a transmissive display 110, a three-dimensional sensor 120, a fitting unit 130, and a display control unit 140.

The transmissive display 110 is a display device of any type in which predetermined information is superimposed and displayed in a three-dimensional space behind itself so that the wearer can visually recognize the information.

The three-dimensional sensor 120 is a detection device of any type that detects coordinate information of objects existing in a field of view of a three-dimensional space through the transmissive display 110. The coordinate information of each object is detected as three-dimensional coordinates of each of a plurality of feature points characterizing the shape of the object.

The fitting unit 130 sequentially acquires coordinate information of each object detected by the three-dimensional sensor 120. Then, each time the coordinate information is acquired, the target object W is specified from among the objects by matching with the three-dimensional model of the target object W stored in advance in, for example, the storage unit 101 or the like, and the three-dimensional model is sequentially fitted to the specified target object W. The three-dimensional model of the target object W comprises a plurality of feature point information characterizing the shape of the target object W.

In the three-dimensional sensor 120, feature point information can be obtained only on a surface portion which can be detected at an existence position of the target object W. However, by applying the three-dimensional model of the target object W to the existence position of the target object W using the obtained feature point information as a clue, it is possible to supplement the feature point information of the portion which cannot be detected by the three-dimensional sensor 120. Therefore, it is possible to obtain the feature point information of the entire target object W at the existence position of the target object W. In the present invention, this process is referred to as fitting. Due to the nature of such fitting, the fitting of the three-dimensional model to the target object W is not necessarily performed visually, and the target object W may be kept in a state in which target the object W is seen as it appears as long as the coordinates of the portion at which the coordinates are not detected by the three-dimensional sensor 120 are relatively specified in relation to the portion at which the coordinates are specified.

The display control unit 140 makes the display to display a back surface shape of the target object detected by the three-dimensional sensor with respect to the front in a gaze direction by superimposing and displaying a three-dimensional model corresponding to a shape viewed from the front in the gaze direction on the target object. In addition, the display control unit 140 makes it possible to hide superimposed display of regions other than a specific range in the gaze direction. As a specific process, the display control unit 140 may cause the transmissive display 110 to display a see-through region in the three-dimensional model by superimposing the see-through region on a predetermined gaze area of the target object W. Here, the see-through region in the three-dimensional model refers to a region corresponding to the predetermined gaze area of the surface of the target object W existing within the field of view through the transmissive display 110. The region is seen through from the surface area of the three-dimensional model superimposed on the target object in a gaze direction from the three-dimensional sensor toward the approximate center of the predetermined gaze area. The predetermined gaze area is, for example, a region of the surface of the target object W visually to be recognized in a predetermined region in the transmissive display 110.

Specific examples will be described referring to FIGS. 3A to 3D and FIG. 4.

Figure 3A:
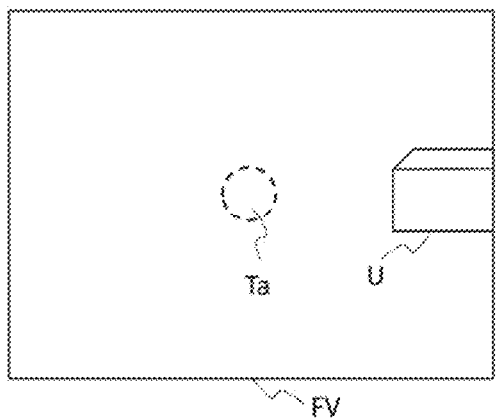
FIGS. 3A to 3D are diagrams illustrating a process of specifying a target object in a field of view of the transmissive display, fitting the three-dimensional model, and specifying a gaze area.
Figure 3B:
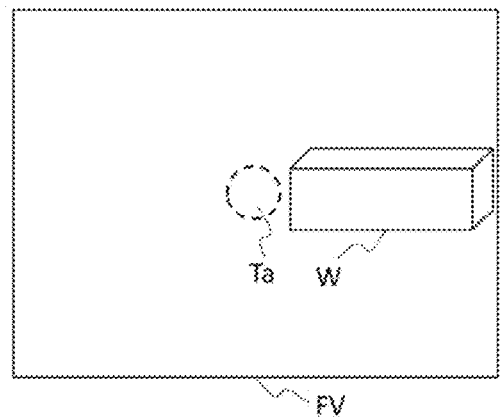

As shown in the FIG. 3A, when part or all of the objects U is captured in the field of view FV through the transmissive display 110, the three-dimensional sensor 120 acquires coordinate information indicating the shape of the objects U, and collates the coordinate information with the three-dimensional model WM of the target object W.

Figure 3C:
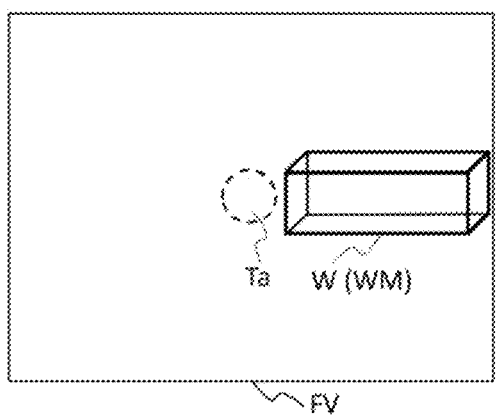

When a certain object U is identified as the target object W by the collation (FIG. 3B), the fitting unit 130 fits the three-dimensional model WM to the target object W as shown in FIG. 3C. In FIG. 3C, the three-dimensional model WM is visually fitted on the target object W in a superimposed manner, but the fitting may not be visibly performed as described above.

Figure 3D:
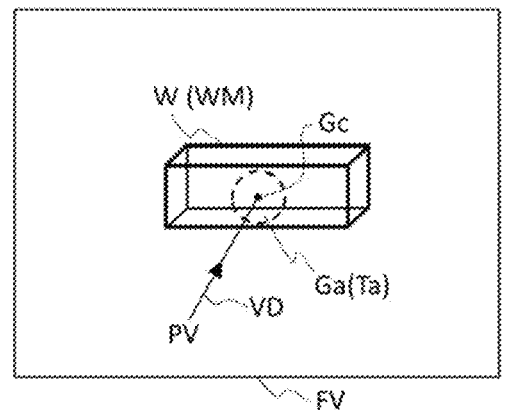

Subsequently, by changing the orientation of the transmissive display 110 or the like, the surface of the target object W is captured in an activation area Ta set in the center portion of the transmissive display 110 as shown in FIG. 3D. Hereinafter, the surface range of the target object W captured in the activation area Ta is referred to as a gaze area Ga, and a direction from the existing position PV of the three-dimensional sensor 120 toward a predetermined position within the gaze area Ga, for example, the substantially center Gc is referred to as a gaze direction VD.

The fitting of the three-dimensional model WM to the target object W is not necessarily performed at the timing when the object U is specified as the target object W, and may be performed, for example, at the timing when the surface of the target object W is captured in the activation area Ta of the transmissive display 110.

The information of the coordinate range of the field of view FV by the transmissive display 110 is successively detected by the three-dimensional sensor 120, and the position of the activation area Ta in the field of view FV is also specified in advance. For this reason, it is possible to specify a coordinate range for a portion within the field of view FV captured by the activation area Ta, for example, the gaze area Ga on the object W. Further, since the existence position PV of the three-dimensional sensor 120 is known in the three-dimensional sensor 120, and the approximate center Gc of the gaze area Ga is also specified within the coordinate range of the gaze area Ga, the gaze direction VD can also be specified.

The display control unit 140 causes the transmissive display 110 to display the see-through region FD, which is seen through in the gaze direction VD from the surface area Gam corresponding to the gaze area Ga, of the three-dimensional model WM fitted to the target object W, by superimposing the see-through region FD on the object W.

Figure 4:
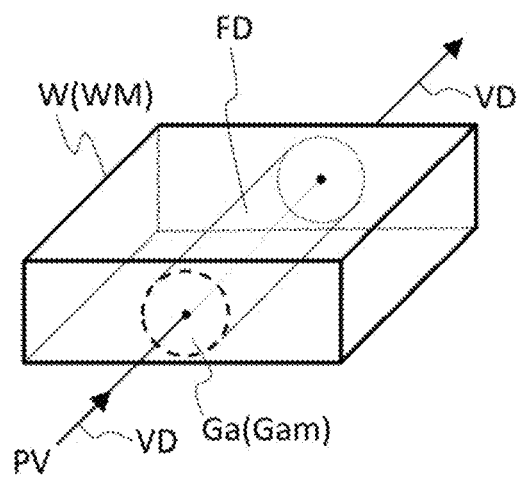
FIG. 4 is a diagram illustrating a see-through region.

As shown in FIG. 4, the see-through region FD is defined as a columnar region that through which the surface area Gam of the three-dimensional model WM corresponding to the gaze area Ga passes when sweeping in the three-dimensional model WM in the gaze direction VD. For example, if the surface area Gam is circular, the see-through region FD has a cylindrical shape.

As described above, the coordinate range of the gaze area Ga (surface area Gam) and the gaze direction VD are specified, and the existence coordinate range of the target object W (and three-dimensional model WM) is also specified by the detection of the feature points by the three-dimensional sensor 120 and the fitting of the three-dimensional model WM. Therefore, the coordinate range of the see-through region FD can be specified based on these pieces of information.

A specific method of superimposing the see-through region FD on the target object W and displaying it on the transmissive display 110 is arbitrary. For example, with respect to the three-dimensional model WM superimposed and displayed on the target object W by fitting, only the see-through region FD from the surface area Gam may be superimposed and displayed on the gaze area Ga of the target object W by transparentizing a region other than the see-through region FD from the surface area Gam. In addition, only the see-through region FD from the surface area Gam may be superimposed on the gaze area Ga of the target object W with respect to the three-dimensional model WM which is fitted to the target object W but is not displayed.

Owing to the visualization apparatus 100 of the present invention configured as described above, by viewing the target object W from the front face through the transmissive display 110, it is possible to see through the back surface shape of the target object W in a simulated manner according to the following principle.

Figure 5A:
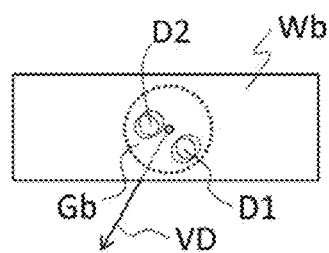
FIGS. 5A to 5D are diagrams illustrating a principle of making the back surface shape of the object being able to be seen through in a simulated manner.

FIG. 5A is a diagram showing examples of the back surface Wb of the target object W when the target object W shown in FIG. 4 is seen from the back surface. The back surface area Gb shown in the drawing 5A is a region which comes out of the back surface Wb when the gaze area Ga is swept in the gaze direction VD, and is the other bottom surface which is paired with the surface area Gam (gaze area Ga) which corresponds to one bottom surface of the see-through region FD which is a columnar region.

Two depressions D1 and D2 exist in the back surface area Gb. Therefore, depressions corresponding to the depressions D1 and D2 also exist on the back surface of the three-dimensional model WM of the target object W.

Figure 5B:
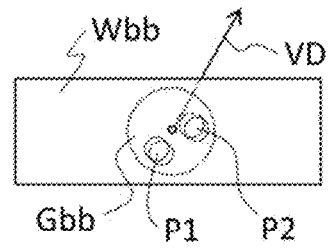

When the target object W is a three-dimensional object filled with contents, the depressions D1 and D2 existing in the back surface area Gb and the back surface area Gb cannot be visually observed from the front surface side. Therefore, assuming that can be observed from the surface side, the projections P1 and P2 corresponding to the depressions D1 and D2 are observed at a position shown in FIG. 5B in a virtual area Gbb corresponding to the back surface area Gb on the virtual surface Wbb corresponding to the back surface Wb.

Figure 5C:
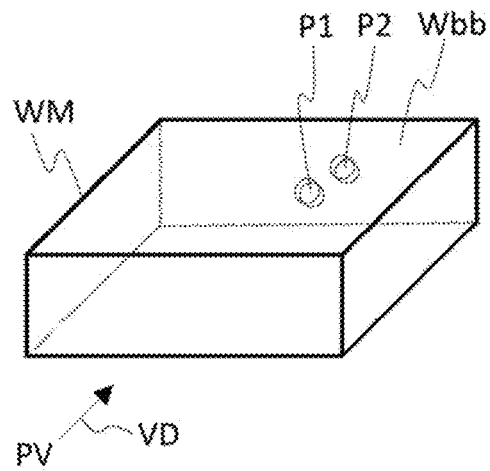

When the three-dimensional model WM is displayed in a wireframe representation at the existence position of the target object W detected in the field of view FV through the transmissive display 110, the projections P1 and P2 on the virtual surface Wbb as shown in FIG. 5C can be observed. However, when the wearer of the transmissive display 110 performs some work, it is generally assumed that the wearer uses a substantially central portion of the field of view FV, and that gazes at a portion of the target object W captured in the central portion.

Figure 5D:
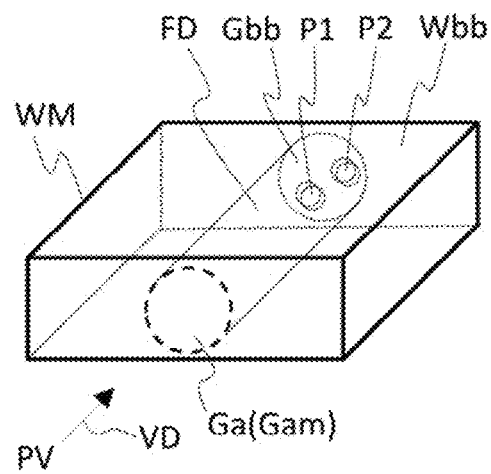
Figure 6:
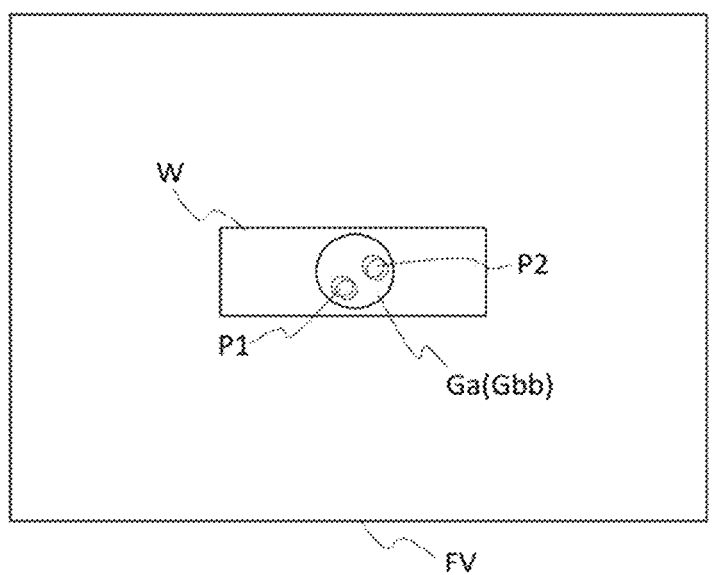
FIG. 6 is a diagram showing an example of a back shape of the object being seen through in a simulated manner.

Therefore, focusing on this, the three-dimensional models WM are visualized and superimposed on the target object W only in the see-through region FD from the gaze area Ga to the gaze direction VD specified on the target object W as shown in FIG. 5D. As a result, when the wearer of the transmissive display 110 directs his/her gaze to the target object W, as shown in FIG. 6, the wearer can observe the virtual surface Wbb inside the target object W as if he/she were seeing through from the gaze area Ga in the gaze direction VD.

Second Embodiment

Figure 7:
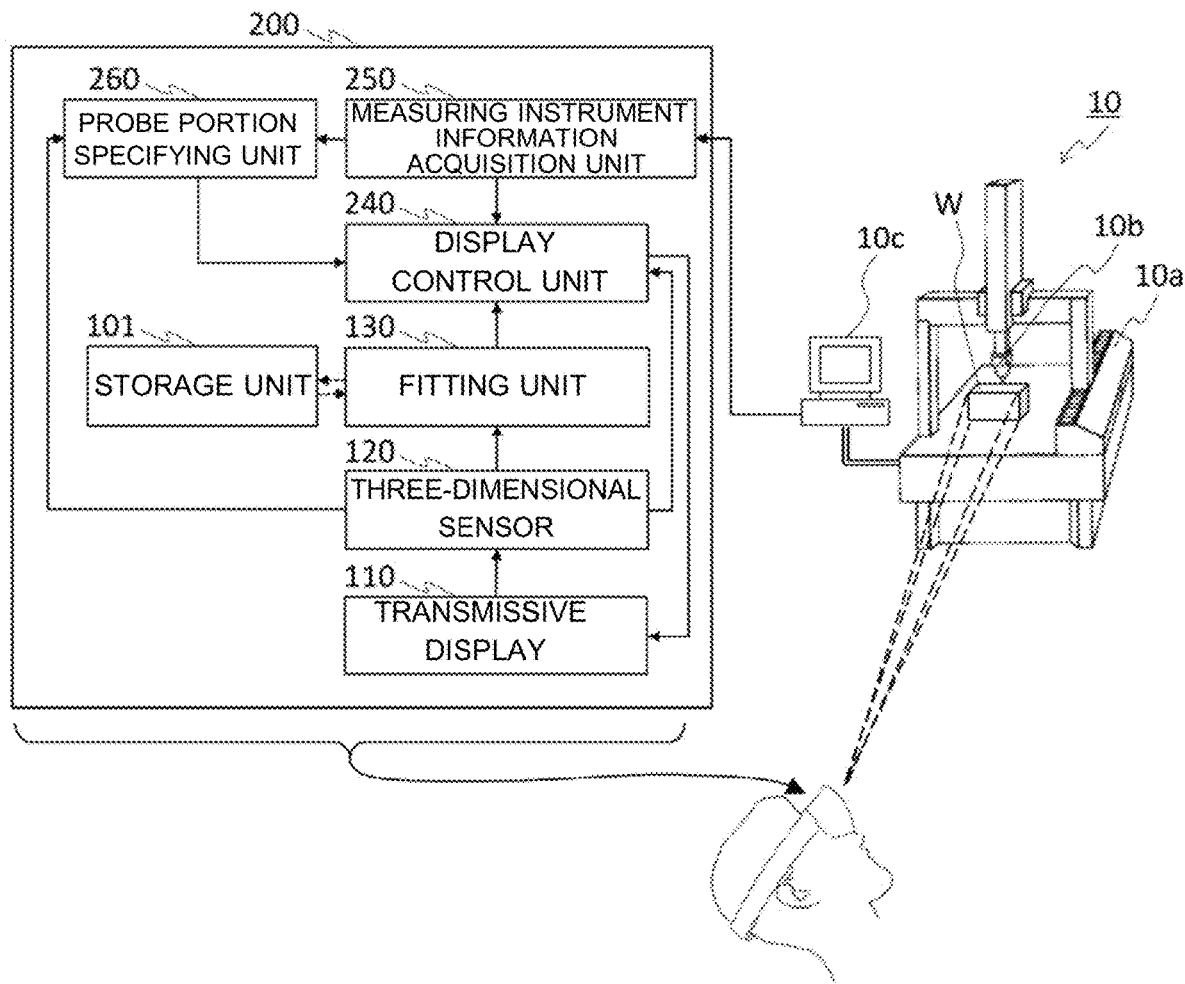
FIG. 7 is a functional block diagram of the visualization apparatus 200 of the present invention.

FIG. 7 shows a functional block diagram of the visualization apparatus 200 of the present invention. The visualization apparatus 200 is suitable for measurement performed in a state where the target object W is placed on the main body 10a of the three-dimensional measuring instrument 10 including the main body 10a, the probe 10b, and the control unit 10c. It is assumed that the measurement coordinate system of the three-dimensional measuring instrument 10 is set to be the same as the detection coordinate system of the three-dimensional sensor 120 by an arbitrary method. Although the case where the measuring instrument is a three-dimensional measuring instrument will be described as an example, the present invention can be applied to other measuring instruments using a probe connected by wire or wireless in the same manner.

When a part of the probe 10b (particularly the tip) is hidden behind the target object W placed on the three-dimensional measurement apparatus 10 and cannot be seen, the visualization apparatus 200 visualizes at least the tip of the probe 10b in a simulated manner and visualizes the back surface shape of the target object W in a simulated manner. Among these, the visualization in the simulated manner of the back surface shape of the target object W is realized by a functional unit corresponding to the visualization apparatus 100 of the first embodiment included in the visualization apparatus 200.

The visualization apparatus 200 includes a transmissive display 110, a three-dimensional sensor 120, a fitting unit 130, a display control unit 240, a measuring instrument information acquisition unit 250, and a probe portion specifying unit 260.

The measuring instrument information acquisition unit 250 acquires the three-dimensional model and coordinate information of the probe 10b of the three-dimensional measuring instrument 10. The three-dimensional model is acquired from an arbitrary storage means in which the three-dimensional model is stored in advance, for example, the storage unit 101. The coordinate information is acquired from the three-dimensional measuring instrument 10. The method of acquiring the three-dimensional model and the coordinate information from the arbitrary storage means and the three-dimensional measuring instrument 10 are arbitrary. When the information is acquired from the three-dimensional measuring instrument 10, the information can be acquired by wireless communication or wired communication of any type via the control unit 10c, for example.

The probe portion specifying unit 260 specifies a portion of the probe where the three-dimensional model having the back surface shape overlaps when the probe exists behind the three-dimensional model superimposed and displayed as the back surface shape of the target object W viewed from the front in gaze direction. As a specific process, when the coordinates of the tip of the probe 10b are included in the coordinate range behind the target object W passing by sweeping the gaze area of the target object W in the gaze direction, the probe portion specifying unit 260 may specify the portion of the probe 10b included in the coordinate range behind the target object W and the existence position of the portion based on the coordinates of the tip and the three-dimensional model of the probe 10*b*.

The display control unit 240 has the following functions in addition to the functions of the display control unit 140. The display control unit 240 superimposes and displays a portion of the three-dimensional model of the probe 10*b* on a predetermined gaze area of the target object W so that a portion of the three-dimensional model corresponding to the portion of the probe 10*b* is visually recognized at a position behind the see-through region corresponding to the position where the portion of the probe 10*b* specified by the probe portion specifying unit 260 exists. For example, the back surface shape may be displayed in a grayscale display color or a wire frame format, and the portion of the probe may be displayed in a true color display color or in a texture mapping format so as to give a texture to the surface of the three-dimensional model. Thereby the back surface shape and the portion of the probe may be superimposed so that they can be clearly distinguished.

Figure 8:
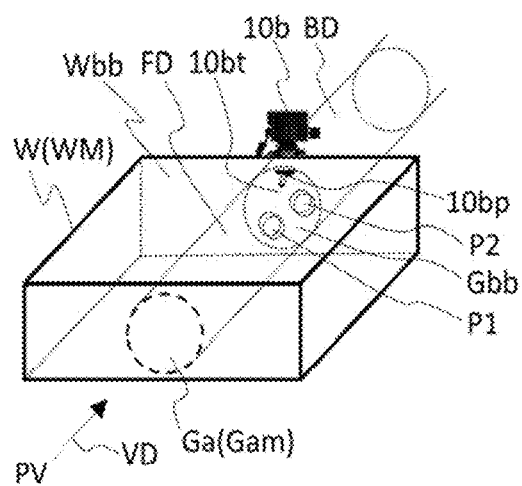
FIG. 8 is a diagram illustrating a principle of making the back surface shape of the target object and a portion of the probe behind the target object being able to be seen through in a simulated manner.

A specific example will be described with reference to FIG. 8.

The probe portion specifying unit 260 determines whether or not the coordinates of the tip 10*bt* of the probe 10*b* are included in the coordinate range BD behind the target object W passing by sweeping the gaze area Ga in the gaze direction VD (or in the coordinate range BD behind the see-through region FD). Then, when it is determined that the coordinates are included in the coordinate range BD, The probe portion specifying unit 260 specifies the portion 10*bp* of the probe 10*b* included in the coordinate range BD behind the target object W and the existence position of the portion 10*bp* based on the coordinates of the tip 10*bt* and the three-dimensional model PM of the probe 10*b*.

Here, the coordinate range BD behind the target object W can be specified based on the gaze area Ga, the coordinate range of the target object W, and the gaze direction VD that have already been specified in the transparentizing process of the target object W. In addition, since the orientation and the movable range of the probe 10*b* in the measurement coordinate system of the three-dimensional measuring instrument 10 are specified, the existing coordinate range of the probe 10*b* can be specified based on the coordinates of the tip 10*bt* of the probe 10*b* and the three-dimensional model of the probe 10*b* acquired by the measuring instrument information acquisition unit 250. Therefore, the portion 10*bp* of the probe 10*b* and the existence position of the portion 10*bp* can be specified as a portion where the existence coordinate range of the probe 10*b* overlaps with the coordinate range BD behind the target object W and the existence position of the portion.

Then, the display control unit 240 superimposes and displays the portion of the three-dimensional model PM of the probe 10*b* on the gaze area Ga of the target object W so that the portion of the three-dimensional model PM of the probe 10*b* corresponding to the portion 10*bp* of the probe 10*b* is visually recognized at the position corresponding to the existence position of the portion bp of the probe 10*b* behind the view area FD.

Figure 9:
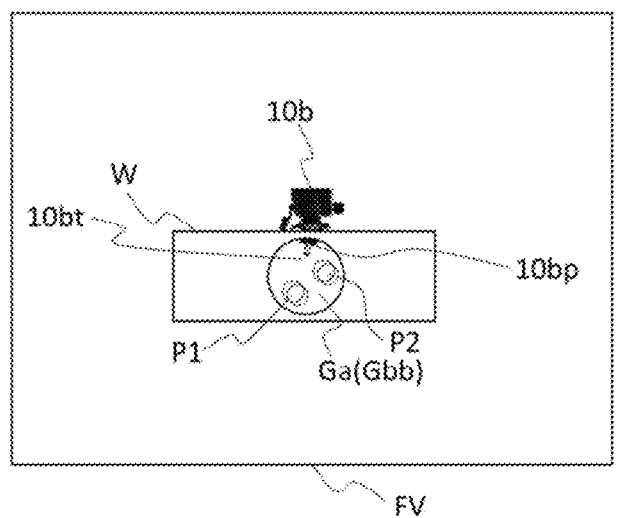
FIG. 9 is a diagram showing an example of the back surface shape of the target object and the portion of the probe behind the target object being seen through in a simulated manner.

According to the visualization apparatus 200 of the present invention described above, when the wearer of the transmissive display 110 directs his/her gaze to the target object W, as shown in FIG. 9, it is possible to observe the virtual surface Wbb inside the target object W and the portion 10*bp* of the probe 10*b* behind the virtual surface Wbb as if they were being seen through in the gaze direction VD from the gaze area Ga. Therefore, the measurement of the back surface of the target object W by the three-dimensional measuring instrument 10 can be performed from the front surface side while checking the position of the probe 10*b* and the back surface shape of the target object W.

In the visualization apparatus 200 of the second embodiment, the gaze area Ga may be a predetermined range of the surface of the target object W centered on the intersection of the line connecting a predetermined position of the transmissive display (for example the center of the display) and the tip 10*bt* of the probe 10*b* and the surface of the target object W, for example. As a result, the gaze area Ga can be changed in accordance with the movement of the probe 10*b* or the wearer of the transmissive display 110.

Third Embodiment

The functions of each unit of the visualization apparatus 100 or the visualization apparatus 200 may be realized by being described in a program and executed by a computer.

Figure 10:
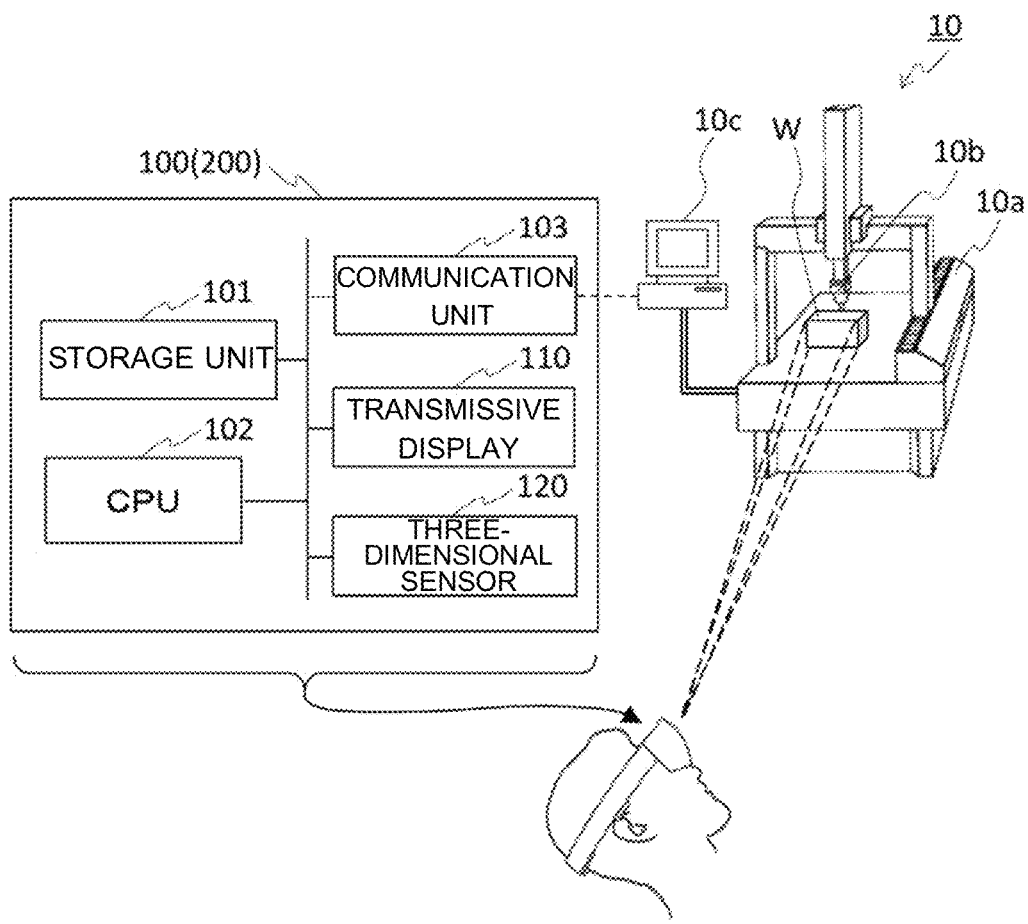
FIG. 10 is a diagram illustrating an exemplary configuration of the visualization apparatus 100 or the visualization apparatus 200 of the present invention that realizes the functions of respective units by executing a program in which the functions of respective units are described by a CPU.

FIG. 10 shows an exemplary configuration of the visualization apparatus 100 or the visualization apparatus 200 when the functions of the respective means are written in a program and executed by a computer.

The visualization apparatus 100 or the visualization apparatus 200 includes, for example, a storage unit 101, a CPU102, a communication unit 103, a transmissive display 110, and a three-dimensional sensor 120.

The CPU102 executes programs stored in the storage unit 101 and realizes the functions of the visualization apparatus 100 or the visualization apparatus 200. The functions of the respective units are described in the programs. The storage unit 101 is an arbitrary storage unit that stores a three-dimensional model or a program, and can employ, for example, a nonvolatile memory, a volatile memory, or the like in addition to a storage medium such as an HDD or a flash memory. Instead of being provided in the visualization apparatus 100 or the visualization apparatus 200, the storage unit 101 may be realized by employing a cloud storage connected via the communication unit 103. The communication unit 103 is an interface for connecting to a wireless network or a wired network, and transmits/receives information to/from the control unit 10*c* of the three-dimensional measuring instrument 10 connected to the network, a cloud storage, or the like in accordance with control by programs executed by the CPU102. The transmissive display 110 and the three-dimensional sensor 120 display information and detect an object respectively, under control of programs executed by CPU102.

The present invention is not limited to the above embodiments. Each embodiment is exemplified, and any embodiment having substantially the same constitution as the technical idea described in the claims of the present invention and exhibiting the same operation and effect is included in the technical scope of the present invention. That is, the present invention can be suitably modified within the scope of the technical idea expressed in the present invention, and forms to which such modifications and improvements are added are also included in the technical scope of the present invention.

For example, in each of the embodiments described above, the shape of the three-dimensional measuring instrument and the method of the probe have been described by taking an example in which the shape is a gate type and the probe is a contact type, but the present invention can be applied to other shapes and other types.

Figure 11A:
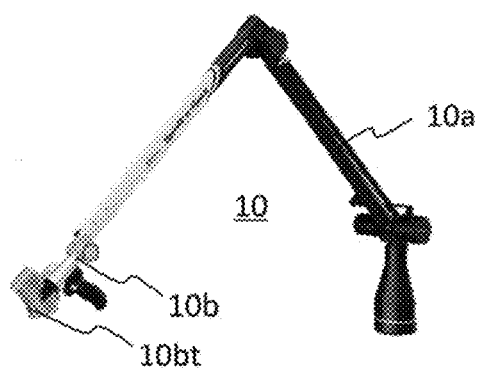
FIGS. 11A to 11C are diagrams showing an example in which the visualization apparatus of the present invention is applied to a three-dimensional measuring instrument employing an articulated arm system and a non-contact type probe.
Figure 11B:
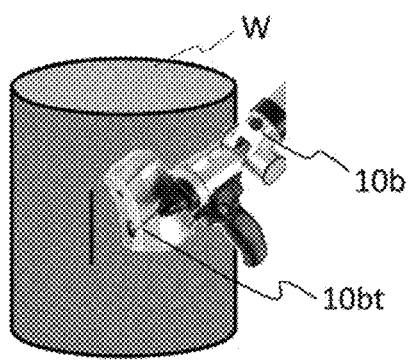
Figure 11C:
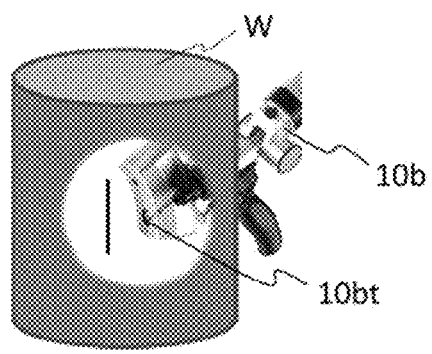

For example, even in the case of the three-dimensional measuring instrument 10 of the multi-joint arm type and the probe of the non-contact type as shown in FIG. 11A, a configuration in which when measuring the surface of the target object W, the measurement is performed while visual recognized the surface as shown in FIG. 11B, and when measuring the back surface, the vicinity of the tip 10bt of the probe 10b is seen-through in a simulated manner as shown in FIG. 11C can be realized in substantially the same manner as in each of the above embodiments.

In each of the above-described embodiments, a case has been described in which a transmissive display capable of visually recognizing a three-dimensional space by transmitting through a display screen is employed as an example of the display, but the display may be a non-transmissive display. In this case, it may be possible to visually recognize the three-dimensional space by displaying an image of the three-dimensional space taken by the camera. As a specific configuration example employing a non-transmissive display, it may be superimposed and displayed predetermined information in a three-dimensional space in a device capable of augmented reality (AR) display such as a smartphone or a virtual reality (VR) device that enables so-called video see-through by combining a head-mounted display and a camera.

The method of determining the gaze area is not limited to the methods shown in the above embodiments. For example, a predetermined gaze area may be a predetermined region of surface of the target object, centered on the intersection of a line from the predetermined position on the display toward the gaze direction and the surface of the target object. Here, the "predetermined position on the display" may be, for example, the center of the display. The "gaze direction" may be, for example, a direction perpendicular to the screen of the display, a direction of the line of sight, a direction at which the tip of the probe exists, and the like. When the gaze direction is the direction of the gaze, the visualization device may be provided with a sensor for detecting the direction of the line of sight of the wearer, and the direction of the line of sight detected by the sensor may be the "gaze direction".

What is claimed is:

1. A visualization apparatus comprising:
   a display that displays predetermined information superimposed on a three-dimensional space to make the predetermined information visible;
   a measuring instrument that measures a three-dimensional shape of an object;
   a three-dimensional sensor that detects coordinate information of the object existing in the three-dimensional space within a field of view through the display;
   a fitting unit for sequentially acquires coordinate information of each object detected by the three-dimensional sensor, matches the coordinate information of the object with a three-dimensional model of a target object prepared in advance for each acquisition to specify the target object from among the objects, and sequentially fits the three-dimensional model to the specified target object;
   a display control unit that make the display to display a see-through region in the three-dimensional model so as to be superimposed on a predetermined gaze area of the target object, the see-through region corresponding to the predetermined gaze area of the surface of the target object existing within the field of view through the display, and the see-through region being seen through from the surface area of the three-dimensional model superimposed on the target object in a gaze direction from the three-dimensional sensor toward the approximate center of the predetermined gaze area;
   a measuring instrument information acquisition unit for acquiring information on the three-dimensional model and tip coordinates of a probe of the predetermined measuring instrument in which the measuring coordinate system is set to be the same as the detecting coordinate system of the three-dimensional sensor by a predetermined method; and
   a probe portion specifying unit for specifying, when the tip coordinates of the probe are included in a coordinate range behind the target object that sweeps through the predetermined gaze area of the target object in the gaze direction, the portion of the probe included in the coordinate range and the existence position of the portion based on the tip coordinates and the three-dimensional model of the probe,
   wherein the display control unit superimposes and displays a portion of the three-dimensional model of the probe on a predetermined gaze area of the target object so that a portion of the three-dimensional model of the probe corresponding to the portion of the probe is visually recognized at a position behind the see-through region corresponding to the existence position of the portion of the probe specified by the probe portion specifying unit.

2. The visualization apparatus according to claim 1, wherein the display control unit makes the display to display the see-through region superimposed on a predetermined gaze area of the target object by transparentizing the region except the see-through region in the three-dimensional model superimposed on the target object.

3. The visualization apparatus according to claim 1, wherein the predetermined gaze area is a region of a surface of the target object that is viewed in a predetermined region in the display.

4. The visualization apparatus according to claim 3, wherein the predetermined gaze area is a predetermined are of the surface of the target object centered on the intersection of a line from a predetermined position on the display toward the gaze direction and the surface of the target object.

5. The visualization apparatus according to claim 1, wherein the predetermined gaze area is a predetermined region of the surface of the target object centered on an intersection point between a line connecting a predetermined position on the display and the tip of the probe and the surface of the target object.

6. A non-transitory computer-readable storage medium having stored thereon executable instructions that when executed by processor of computer control the computer to perform as each unit constituting the visualization apparatus according to claim 1.

7. A visualization apparatus comprising:
   a display that enables visualization of a predetermined information by superimposing the predetermined information in a three-dimensional space;
   a measuring instrument that measures a three-dimensional shape of objects;
   a three-dimensional sensor that detects coordinate information of objects existing in the three-dimensional space within a display range of the display;
   a fitting unit that sequentially acquires coordinate information of each object detected by the three-dimensional sensor, matches the coordinate information of the object with a three-dimensional model of a target object prepared in advance for each acquisition to specify the target object from among the objects, and sequentially fits the three-dimensional model to the specified target object;

a display control unit that make the display to display a back surface shape of the target object detected by the three-dimensional sensor with respect to the front in a gaze direction by superimposing and displaying a three-dimensional model corresponding to a shape viewed from the front in the gaze direction on the target object;

a coordinate measuring instrument information acquisition unit for acquiring information of the tip coordinate of a probe in a predetermined measuring instrument in which the measuring coordinate system is set to be the same as the detection coordinate system of the three-dimensional sensor according to a predetermined method; and a probe portion specifying unit for specifying a portion of the probe overlapping the three-dimensional model of the back surface shape when the probe is present behind the three-dimensional model superimposed on the target object as the back surface shape of the target object viewed from the front in the gaze direction, wherein the fitting unit fits the three-dimensional model of the probe to the portion of the probe specified by the probe portion specifying unit, and the display control unit makes the three-dimensional model corresponding to the back surface shape of the target object viewed from the front in the gaze direction and the three-dimensional model fitted to the portion of the probe present therebehind be visibly distinguished.

8. The visualization apparatus according to claim 7 wherein, when the three-dimensional model corresponding to the shape seen from the front in the gaze direction is superimposed on the target object, the display control unit hides the superimposed display of the region other than the specific range in the gaze direction.

9. A non-transitory computer-readable storage medium having stored thereon executable instructions that when executed by processor of computer control the computer to perform as each unit constituting the visualization apparatus according to claim 7.

\* \* \* \* \*